United States Patent
Sun et al.

(10) Patent No.: US 7,830,166 B2
(45) Date of Patent: Nov. 9, 2010

(54) PULSE SHIFT MODULATION FOR REDUCING CROSS-TALK OF SINGLE ENDED I/O INTERCONNECTS

(75) Inventors: Welmin Sun, Boxborough, MA (US); Karl Wyatt, Cary, IL (US); Bo A. Zhang, Boxborough, MA (US)

(73) Assignee: Intel Corporation, Santa Clara, CA (US)

( * ) Notice: Subject to any disclaimer, the term of this patent is extended or adjusted under 35 U.S.C. 154(b) by 1493 days.

(21) Appl. No.: 11/172,502

(22) Filed: Jun. 29, 2005

(65) Prior Publication Data

US 2007/0014226 A1 Jan. 18, 2007

(51) Int. Cl.
*H03K 3/00* (2006.01)
*H03K 5/13* (2006.01)
*H03K 5/14* (2006.01)
*H03K 17/16* (2006.01)

(52) U.S. Cl. .................................. 326/21; 327/237
(58) Field of Classification Search .............. 326/21; 327/231, 237
See application file for complete search history.

(56) References Cited

U.S. PATENT DOCUMENTS

| | | | |
|---|---|---|---|
| 6,128,769 A | 10/2000 | Carlson et al. | |
| 7,043,706 B2 | 5/2006 | Brist et al. | |
| 7,075,795 B2 | 7/2006 | Wu et al. | |
| 2004/0165677 A1 | 8/2004 | Shen et al. | |
| 2005/0068885 A1 | 3/2005 | Becker et al. | |
| 2006/0123371 A1 | 6/2006 | Brist et al. | |
| 2008/0130781 A1* | 6/2008 | Taghizadeh-Kaschani | .. 375/285 |

OTHER PUBLICATIONS

Mohanavelu, et al. "Crosstalk Reduction Method, Apparatus, and System," U.S. Appl. No. 11/092,241, filed Mar. 29, 2005.

\* cited by examiner

*Primary Examiner*—David Mis
(74) *Attorney, Agent, or Firm*—David P. McAbee

(57) ABSTRACT

A method and apparatus is described herein for pulse shift modulation of output waveforms for reducing crosstalk on interconnects. Based on input pulses/bits, an output waveform is selectively delayed by a shift value to ensure transitions in a first direction occur in a first half of a period and transitions in a second direction occur in a second half of the period. When the same pulse shift modulation is implemented on surrounding traces, certain worst-case crosstalk scenarios are reduced; thus reducing crosstalk and increasing performance in power consumption and speed of data transfer.

20 Claims, 8 Drawing Sheets

*Eye diagram of a victim line with crosstalk and no pulse shift modulation*

*Crosstalk on the victim line with no pulse shift modulation*

*Eye diagram of a victim line with crosstalk and pulse shift modulation*

*Crosstalk on the victim line with pulse shift modulation*

PULSE SHIFT MODULATION FOR REDUCING CROSS-TALK OF SINGLE ENDED I/O INTERCONNECTS

FIELD

This invention relates to the field of computer systems, and in particular, reducing cross-talk on interconnects.

BACKGROUND

As computers advance, integration of platforms and their components become a larger and more complex task. As devices within computers continue to evolve, the speed at which the devices internally run increases. To this end, interconnects between devices become a limiting performance factor, if the speed at which the interconnects transmit data is not increased. Previously, interconnects at much slower speeds were much more concerned with the digital design of the output buffer, as compared to the integrity of signals transmitted.

However, as speeds of transmitted signals on interconnects have progressed from MHz to GHz, the need for better signal integrity has become essential. As the frequency of transmitted signals continue to increase timing and signal integrity is even more important in ensuring that valid and correct data is transmitted. Unfortunately, a design of a single buffer and a single trace of an interconnect is not enough to ensure good signal integrity on a bus. Since traces are present in the same dielectric and are often made of conductive material, cross-coupling with surrounding traces may significantly affect the performance and integrity of signals on a victim trace.

A simple way of viewing this interdependency is illustrated in FIG. 1. Although a greater number of traces may be present in forming an interconnect, only three traces are depicted in FIG. 1, which include, aggressor line 105, victim line 110, and aggressor line 115. When a signal is transmitting on aggressor lines 105 and 115, cross-coupling, also referred to as crosstalk, occurs between the aggressor lines and victim line 110. One of the potentially worst case crosstalk scenarios for timing windows is shown in FIG. 1, where aggressor lines 105 and 115 are transitioning in the opposite direction of victim line 110. In this case, some ringing, or other adverse signal integrity effect, may be induced by aggressor lines 105 and 115 causing crosstalk 120.

Since designers often take worst-case scenarios into account when designing interconnects, the opposing transitions illustrated in FIG. 1 often limits bus performance.

BRIEF DESCRIPTION OF THE DRAWINGS

The present invention is illustrated by way of example and not intended to be limited by the figures of the accompanying drawings.

DETAILED DESCRIPTION

In the following description, numerous specific details are set forth such as specific logic transitions, timings, and worst case scenarios in order to provide a thorough understanding of the present invention. It will be apparent, however, to one skilled in the art that these specific details need not be employed to practice the present invention. In other instances, well known components or methods, such as output buffer design, pulse generation, delaying techniques, comparing techniques, etc., have not been described in detail in order to avoid unnecessarily obscuring the present invention.

Logic Levels

Figure 2A:
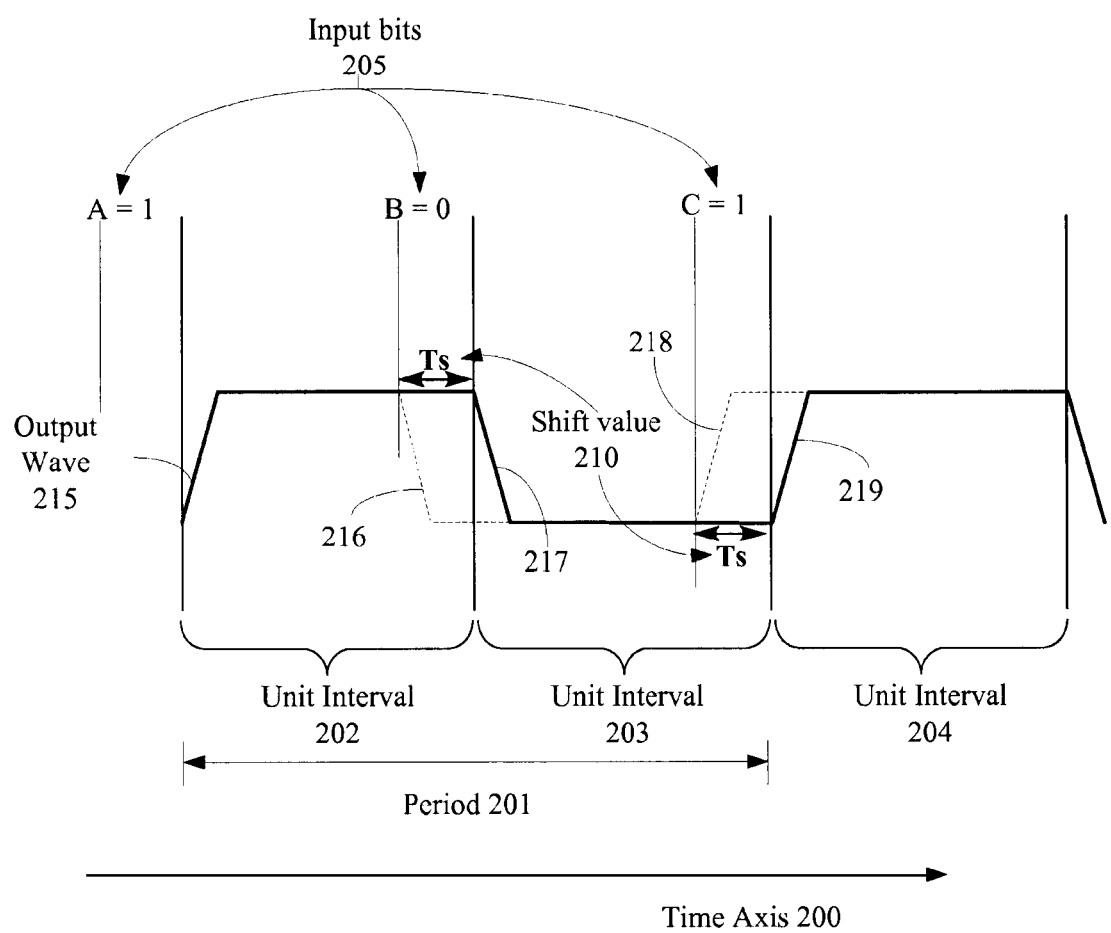
FIG. 2a illustrates an embodiment of a timing diagram for ensuring rising edges occur in a first unit interval and falling edges occur in a second unit interval.

FIG. 2a illustrates an embodiment of a timing diagram for modulating an output pulse to reduce crosstalk. Input bits 205, which are referred to as A, B, and C in FIG. 2a, are illustrated at a logic level of 1, 0, and 1, respectively. The 1's and 0's simply refer to binary logic states. For example, a 1 refers to a high logic level and 0 refers to a low logic level. In many older systems a high voltage level was represented by a voltage at 5V and a low voltage level at 0V. As another specific example, a high logic level is at 1.2V and a low logic level is at 3V. However, a high logic level may refer to any logic level above a threshold value, and inversely, a low logic level may refer to any logic level below the threshold value.

Transitions

When a wave or pulse shifts between logic levels, it is commonly referred to as a transition. For example, a shift in a pulse from a high logic level to a low logic level is typically denoted a falling edge transition, as the wave is "falling" from a high logic level to a low logic level. Alternatively, when changing from a low logic level to a high logic level, that transition is commonly referred to as a rising edge transition.

Period and Unit Intervals

Along time axis 200, period 201 is illustrated. A period is often referred to as the time take for one complete oscillation of a wave. Here, period 201 is broken down into two unit intervals, first unit interval 202 and second unit interval 203, which includes the first half of period 201 and second half of period 201, respectively.

Generating a Selectively Delayed Output Pulse/Wave

Previously, in generating output wave 215 from input bits 205, pulse generation logic would receive an input bit and start to generate the output waveform based on that input bit. However, as discussed above in the background section, if input bits are at an opposite on aggressor lines surrounding a victim line, then a potentially worst-case cross-talk scenario may occur.

Therefore, certain transitions, based on design, may be delayed, i.e. shifted in time, to avoid specific cross-talk scenarios. The specific embodiment in FIG. 2 illustrates the delaying of output wave 215 for certain logical transitions to ensure that rising edges occur in first unit interval 202 and falling edges occur in second unit interval 203. Therefore, if surrounding traces of an interconnect implement this protocol, then the scenario in FIG. 1, where surrounding traces are transitioning in opposite directions at the same time, potentially does not occur. The rising and falling edges are shifted to transition in the same unit intervals.

FIG. 2a illustrates a specific embodiment of delaying output wave 215 to ensure rising edges occur in first unit interval 202 and falling edges occur in second unit interval 203. If output wave 215 is not delayed by shift value 210 in unit interval 202, falling edge 216 would occur in first unit interval 202. Yet, by comparing input bit A, which a high logic level of 1, and input bit B, which is a low logic level 0, it is determined that a falling edge, such as falling edge 216, is to occur. Consequently, generation of output wave 215 is delayed by shift value 210 to ensure that falling edge 217 occurs in second unit interval 203.

Additionally, when comparing input bit C to input bit B, it is determined that rising edge 218 is to occur in unit interval 203. Therefore, output wave 215 is delayed by shift value 210 to ensure that rising edge 219 occurs in third unit interval 204, not unit interval 203.

Figure 2B:
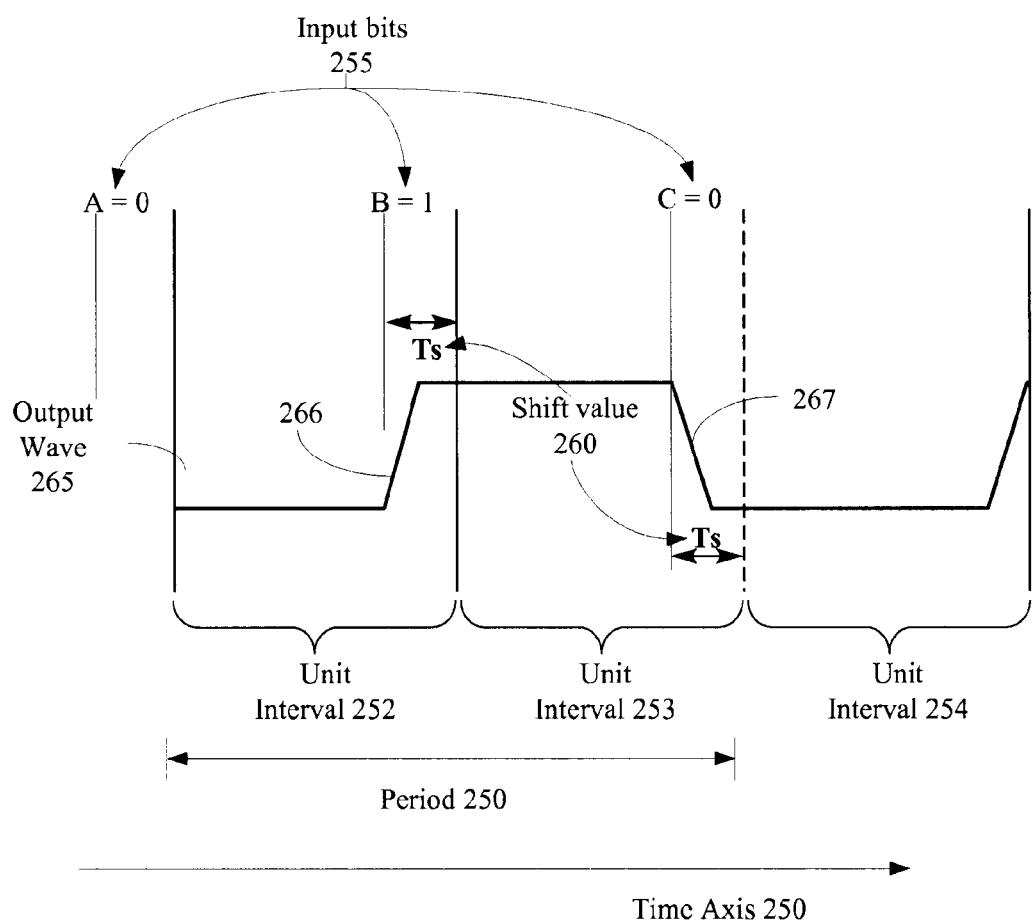
FIG. 2b illustrates another embodiment of a timing diagram for ensuring rising edges occur in a first unit interval and falling edges occur in a second unit interval.

To illustrate a different input bit pattern, FIG. 2b depicts an embodiment where inputs bits 255 (A, B, and C) have a 0, 1, 0 bit pattern, respectively. After determining that there is a rising edge between input bits A and B, output wave 265 is not delayed by the shift value. Consequently rising edge 266 is generated without delaying wave 265 by shift value 260 and rising edge 266 occurs in first unit interval 252, not in second unit interval 253. In addition, when comparing input bits B and C, it is a determined that a falling direction transition is to occur. Once again, to ensure the falling edge occurs in second unit interval 253, no shift value delay is introduced into the generation of output wave 265. Therefore, falling edge 267 occurs in second unit interval 253.

In FIGS. 2a and 2b, if a logical transition between input pulse A and input pulse B was a in a falling direction then the output wave was delayed by a shift value to ensure the falling edge occurred in the later unit interval. Moreover, if the logic transition was in a rising direction, no delay was introduced. However, pulse shift modulation is not so limited.

In fact, by design it may be ensured that falling edges occur in a first unit interval and rising edges occur in the second unit interval. In this embodiment, a logical transition between input pulse A and input pulse B that is in a rising direction is delayed by a shift value to ensure the rising edge occurs in the later unit interval. And, if the logic transition is in a falling direction, no delay is introduced to ensure the falling edge occurs in the current unit interval.

Also note, that no delay may be introduced in a scenario where consecutive input bits, such as input bits A and B, are at the same logic level. In this scenario, no rising or falling edge occurs, so delaying of the output waveform may not occur.

An Embodiment of a Module to Generate a Selectively Delayed Output Wave

Figure 3:
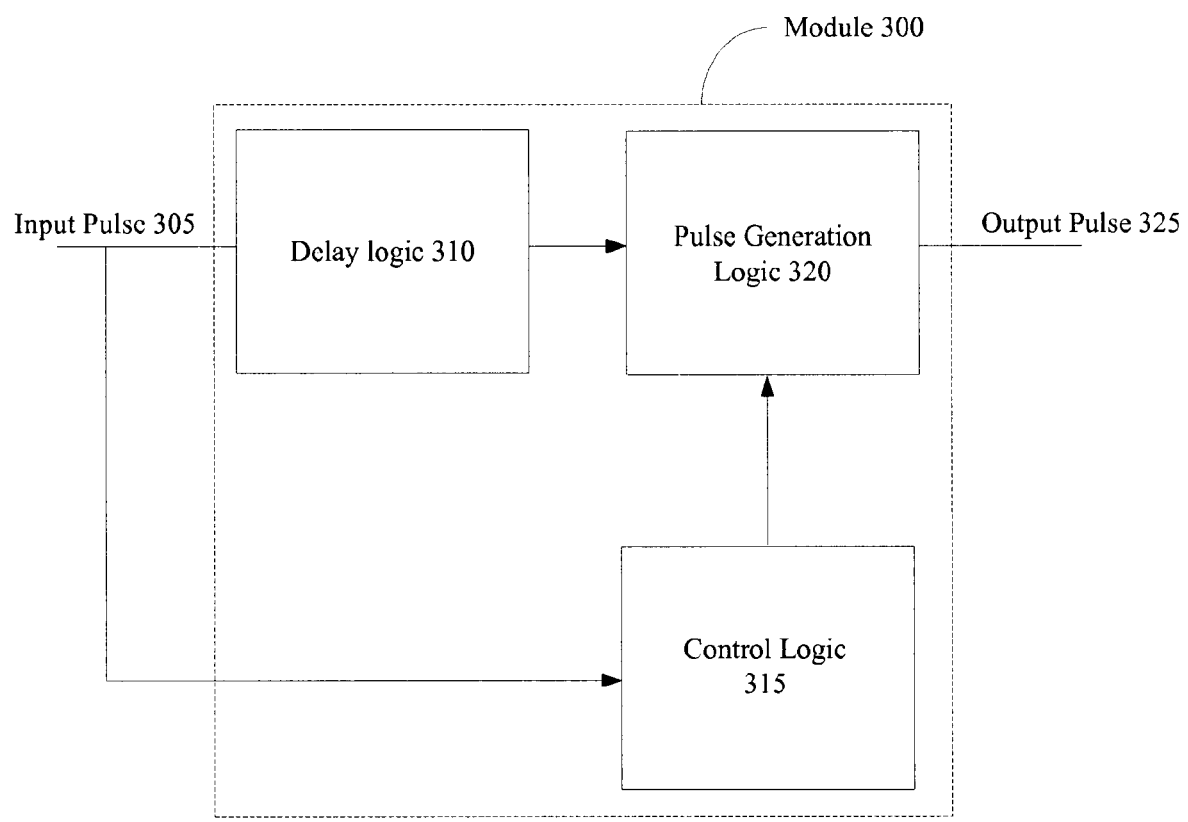
FIG. 3 illustrates an embodiment of a module to selectively delay an input pulse and generate an output pulse.

Turning to FIG. 3, an embodiment of a module to selectively delay an input pulse and generate an output wave is illustrated. A module may be implemented in hardware, software, firmware, or any combination thereof. Commonly, module boundaries vary and functions are implemented together, as well as separately in different embodiments. Input pulse 305 is inputted into delay logic 310 and control module 315. Input pulse may be any logic level representation, form of pulse, and/or bits to provide input logic levels to module 300. As an example, input pulse 305 provides input bits to module 300.

Control module 310 is to compare a previous pulse/bit to a current pulse/bit. For example, in FIGS. 2A and 2B, when module 300 receives input bit B, input bit B is the current pulse and input bit A is the previous pulse. As stated above, the combination of the previous pulse and current pulse in the output waveform is referred to as a period, or symbol period. Consequently, as mentioned above, if the previous pulse was a low logic level and the current pulse is a high logic level, then it is determined that a rising edge is to occur. If the previous pulse is at a high logic level and the current pulse is at a low logic level, then it is determined that a falling edge is to occur.

Delay module 310 is to delay the current pulse by a shift value based on the comparison of the previous pulse and the current pulse. Delay module 310 may do its own comparison of the pulses or base the comparison off control module 310's comparison. In one embodiment, delay module 310 is delay logic to simply delay a pulse or signal. In another embodiment, delay module 310 comprises comparison and delay logic. Module 310 may also include other hardware, software, or firmware. Note from above that the boundaries of modules, such as the three modules shown, may blur and overlap.

If the previous pulse is at a first logic level and the current pulse is at a second logic level, then the current pulse is delayed. Delaying of the current pulse, i.e. generation of a delayed output pulse 325, may include actual delay of the input pulse before pulse generation module 320 receives the input pulse and/or receiving the current input pulse with pulse generation module 320 and delaying the generation of output pulse 325. In one embodiment, the first logic level is a high logic level and the second logic level is a low logic level. Here, a falling edge would be delayed to ensure the falling edge occurs in the second half of a symbol period. In an alternate embodiment, the first logic level is a low logic level and the second logic level is a high logic level. In this situation, a rising edge of the output waveform is delayed to ensure the rising edge occurs in the second half of the output waveform's symbol period.

The shift value used by delay logic may be any user-defined or predetermined value. In one example, the shift value is a predetermined value, based on the amount of delay introduced by logic within delay module 310. In another embodiment, the shift value is a user-definable value, which may be changed dynamically.

Pulse generation module 320 generates output pulse 325. Pulse generation module 320 may include any hardware, software, or firmware for generating a waveform. For example, pulse generation module 320 includes a pre-driver stage and a driver stage. Pulse generation module 320 may also include other logic and features such as compensation circuitry, amplifiers, testing logic, receiving logic, etc. Pulse generation module 320 may either partially or wholly overlap with control module 315 or delay module 310. If it is determined that output pulse 325 is to be delayed, then either based on a delayed signal from delay module 310 or by delaying the generation of output pulse 325 itself, pulse generation module 320 generates output pulse 325.

An Embodiment of Implementing Pulse Modulation to Reduce Crosstalk in a System

Figure 4:
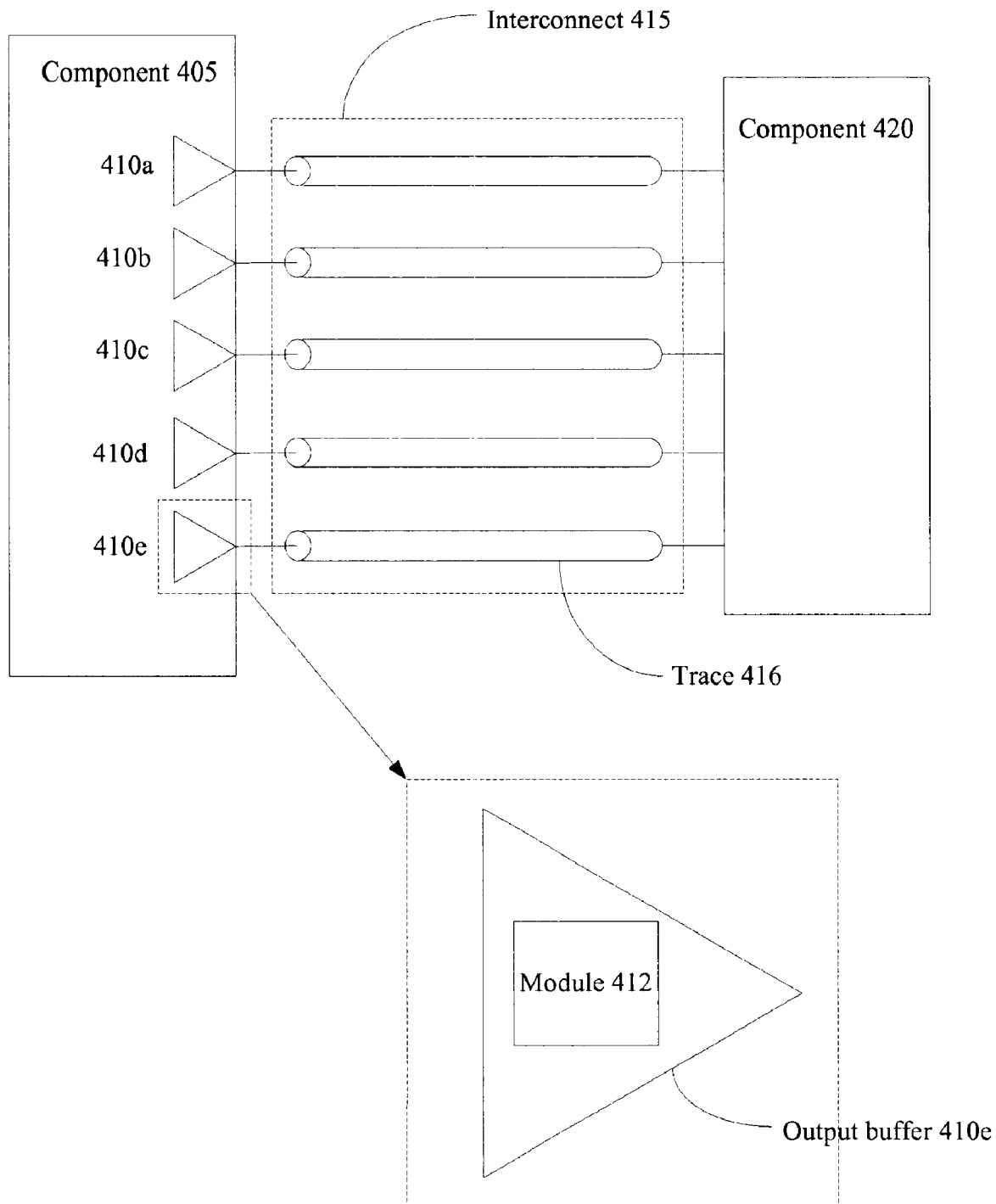
FIG. 4 illustrates an embodiment of a system having a component that modulates output pulses to reduce crosstalk on an interconnect.

Turning to FIG. 4 an embodiment of a system having a component to modulate output pulses for reduction of crosstalk is illustrated. Device 405, also referred to as component 405, comprises plurality of buffers 410a-410e. Component 405 includes any device or circuit having a buffer for transmitting data. Component 420, which is coupled to component 405 through interconnect 415, may also be any device in or coupled to a computer.

Examples of component 405 and component 420 include an embedded controller, a microcontroller, a microprocessor, a co-processor, a digital signal processor, a processing cell, an out-of-order microprocessor capable of multi-threaded execution, a controller hub, a chipset, a CSI device, a video controller, a graphics processor, a network device, a memory, an audio device, a bridge device, and a peripheral device.

Component 405 is coupled to component 420 through a plurality of traces, such as trace 416. Trace 416 is illustrated as a transmission line. However, trace 416 may be any medium through which logic signals are transmitted. The plurality of traces comprise interconnect 415. Interconnect 415 includes any bus or interconnect for coupling devices. Examples of interconnect 415 include a front-side bus (FSB), a universal serial bus (USB), a peripheral connection interconnect (PCI) bus, a common standard interface (CSI), a memory bus, a controller link bus, a peripheral bus, a video graphics bus, an advanced graphics port (AGP) bus, and a back-side bus.

Each buffer within component 405 includes a module, such as module 412 illustrated in the enlarged view of buffer 410e. Module 412 is to generate a selectively delayed output waveform based on a transition between a first input bit and a second input bit. In one embodiment, module 412 includes a control module to determine if a transition between the first input bit and the second input bit is in a first direction and a pulse generation module to generate the output waveform delayed by a shift value, if the transition between the first input bit and the second input bit is in the first direction.

Figure 1:
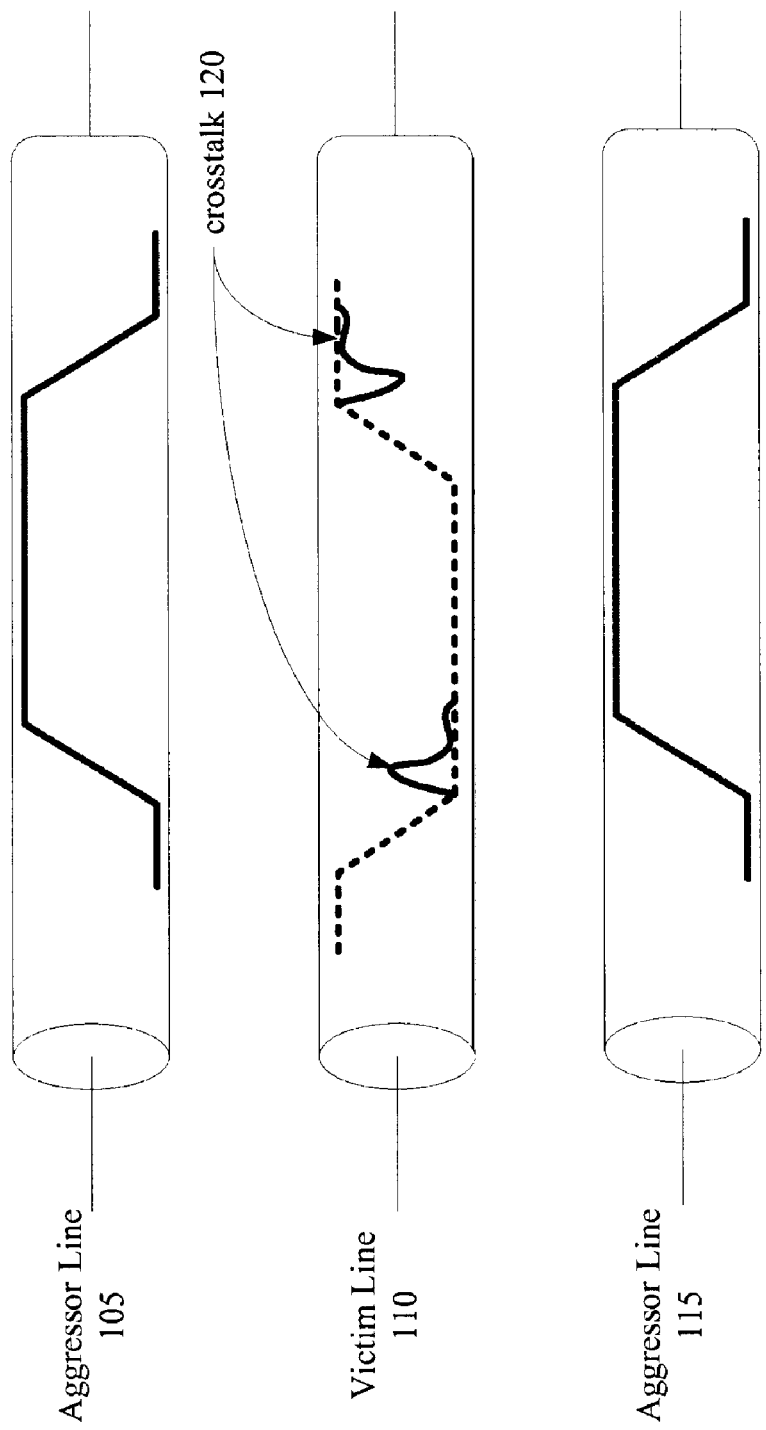
FIG. 1 illustrates an embodiment of three traces of an interconnect with crosstalk.

In one example, the first direction is a falling direction. Therefore, upon determining that a falling edge is to occur, the output waveform is delayed by a shift value to ensure the falling edge occurs in a second unit interval of the output waveform. If all of the buffers in component 405, buffers 410a-410e, have a module, such as module 412, then, if any rising edges are to occur, they occur in the first unit interval and if any falling edges are to occur, they occur in the second unit interval. Conversely, if the first direction is a rising direction, then falling edges would occur in the first unit interval and rising edges would occur in the second unit interval. Consequently, as long as the same protocol is implemented in the buffers, then the crosstalk scenario illustrated in FIG. 1 is potentially avoided, as opposite direction transitions are delayed to a later unit interval.

An Embodiment of a Method for Shifting and Output Wave to Reduce Crosstalk

Figure 5:
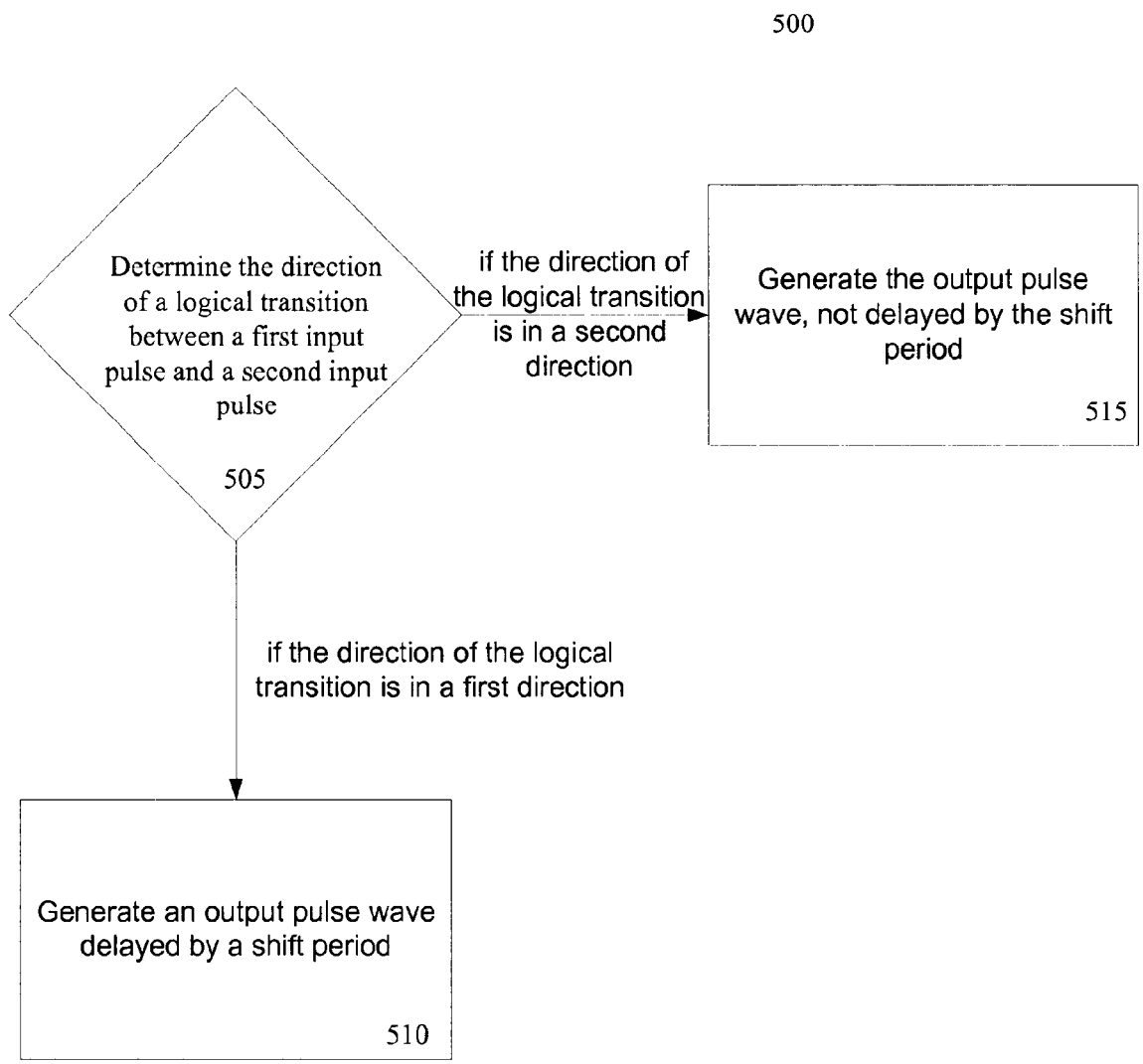
FIG. 5 illustrates an embodiment of a flow diagram for a method of modulating an output pulse to reduce crosstalk.

Turning to FIG. 5 and embodiment of a flow diagram for shifting an output wave to reduce crosstalk is illustrated. The direction of a logical transition between a first input pulse and second input pulse is determined at 505. The direction of transition may be determined in any number of ways.

In a first embodiment, the logic level of the first input pulse is compared to the logic level of the second input pulse. In a signaling scheme having only a high logic level and a low logic level, the comparison yields three potential results: (1) a rising edge transition, as the first input pulse is at a low logic level and the second input pulse is at a high logic level; (2) a falling edge transition, as the first input pulse is at a high logic level and the second input pulse is at a low logic level; and (3) no transition as the first and second input pulses are at the same logic level. However, for a signaling scheme that utilizes more than two logic levels, the comparison is done to see if the second signal is at a higher or lower voltage level to determine if a rising or falling edge is to occur.

In another embodiment, the direction of a transition is determined by detecting a rising or falling edge in the input pulse. Here, the transition is sampled at two different times resulting in two sampled voltage levels. From the sampled voltage levels, it is determined if the transition is a rising or falling edge. Other known methods of determining the direction of a transition may be used.

If the direction of the logical transition is in a first direction, an output pulse wave delayed by a shift period is generated at 510. In a first embodiment the first direction is a falling direction. Therefore, if the input pulse for a symbol period comprises two halves, a first half of the period, i.e. a first unit interval, with a high logic value and a second half of the period, i.e. a second unit interval, with a low logic value, then the falling edge is delayed by a shift period to ensure the falling edge occurs in a second half of the output waveform's symbol period. In a second embodiment the first direction is a rising direction. Consequently, the rising edge is delayed by the shift period to ensure the rising edge occurs in the second half of the output waveform's symbol period. When the aforementioned method is implemented on surrounding traces, the first direction of transition occurs in the second unit interval to avoid aggressor lines surrounding a victim line from transitioning in the opposite direction during the same unit interval; thus, reducing crosstalk.

If the direction of the logical transition is in a second direction, the output pulse wave, not delayed by the shift period, is generated at 515. Following from the embodiments above, when the first direction is a falling direction then the second direction is a rising direction. In that instance, rising edges of the output waveform occur in the first unit interval and falling edges occur in the second unit interval. Alternatively, where the first direction is a rising direction and the second direction is a falling direction, the falling edges occur in the first half of the symbol period and the rising edges occur in the second half of the symbol period.

Simulation Results

First, the effect of crosstalk with buffers generating random data, not utilizing pulse shift modulation as herein described is illustrated in Figures A.1 and A.2. Simulations are run in a sample system transmitting between two devices at 2 Gbps. 150,000 randomly generated data patterns are captured and overlaid on each other to form an "eye" diagram. The eye diagram simply refers to the size of the eye in the middle of the waveforms, where no waveforms are present. They eye extends in the y-direction in voltage and in the x-direction in time. The more voltage in the y-axis and the more time in the x-axis the better the potential performance of the interconnect. Note in this case that the scenario illustrated in FIG. 1 may potentially occur, where the aggressor lines are transitioning in the opposite direction of the victim line during the same unit intervals.

Figure 7:
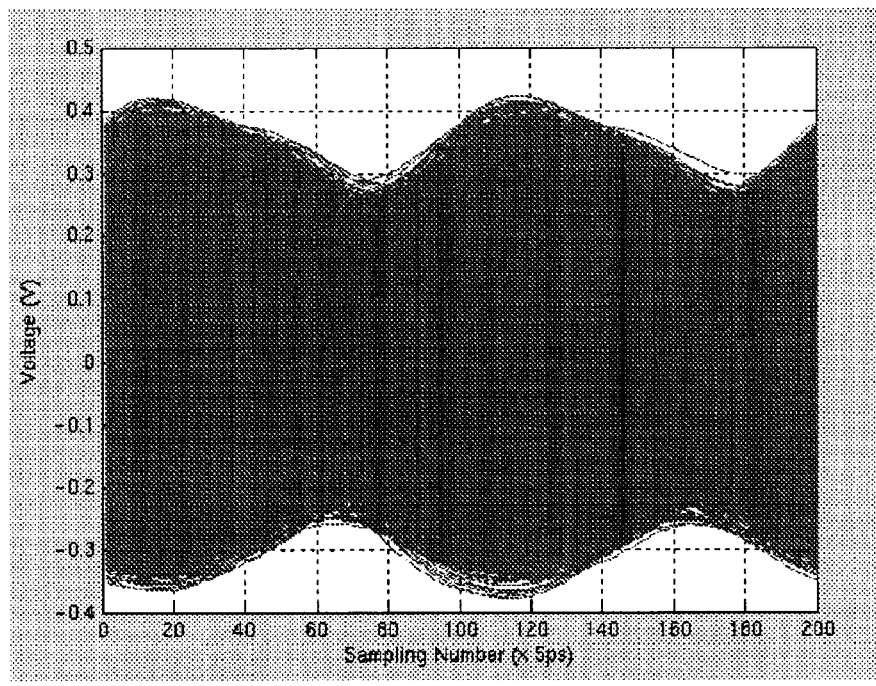
FIG. 7 illustrates another embodiment of a simulation result for cross-talk.

From FIG. 7 it is readily apparent that the crosstalk approximately ranges from −380 mV to 410 mv significantly degrading the opening of the eye in Figure A.1. This degradation in the opening of the eye in Figure A.1 potentially leads to degraded power, timing, and signal parity performance.

Figure 8:
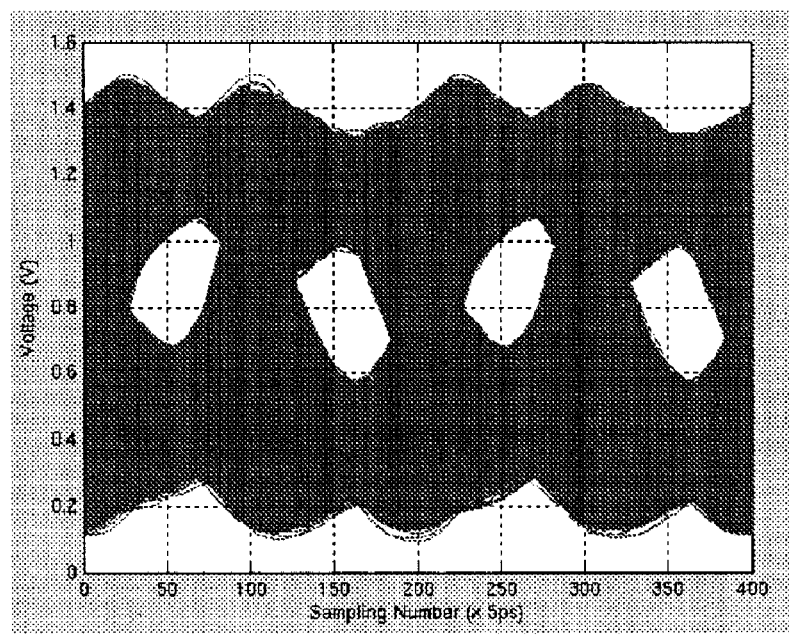
FIG. 8 illustrates another embodiment of a simulation result for cross-talk.
Figure 9:
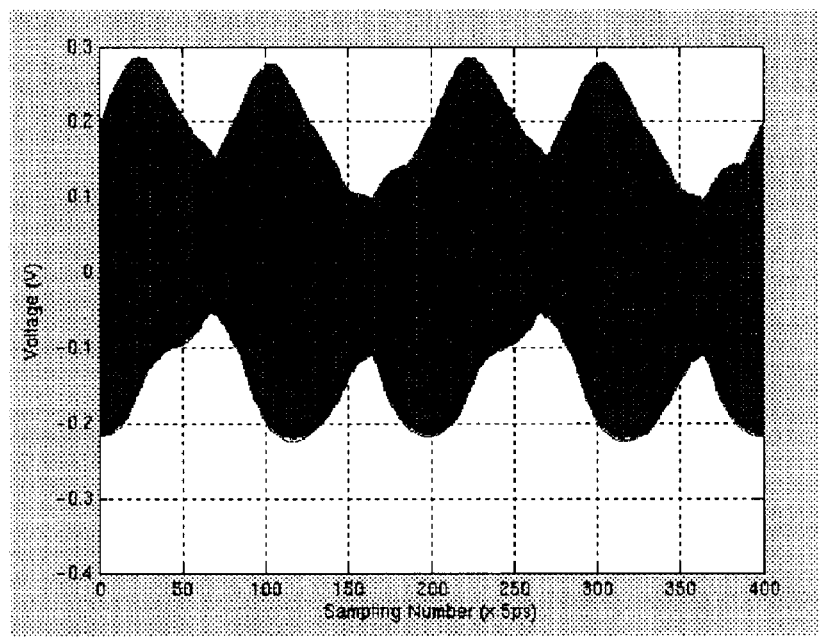
FIG. 9 illustrates another embodiment of a simulation result for cross-talk.

Second, the FIGS. 8 and 9 the same simulation conditions were imposed, with pulse shift modulation enabled. In this instance, as described in embodiments above, if a falling edge was detected to occur between a first unit interval and a second unit interval, the falling edge was delayed to ensure it occurred in the second unit interval. This protocol was implemented on the aggressor lines, as well as the victim lines, so rising edges occurred in the first unit interval of a symbol period and falling edges occurred in the second unit interval of the symbol period.

Figure 6:
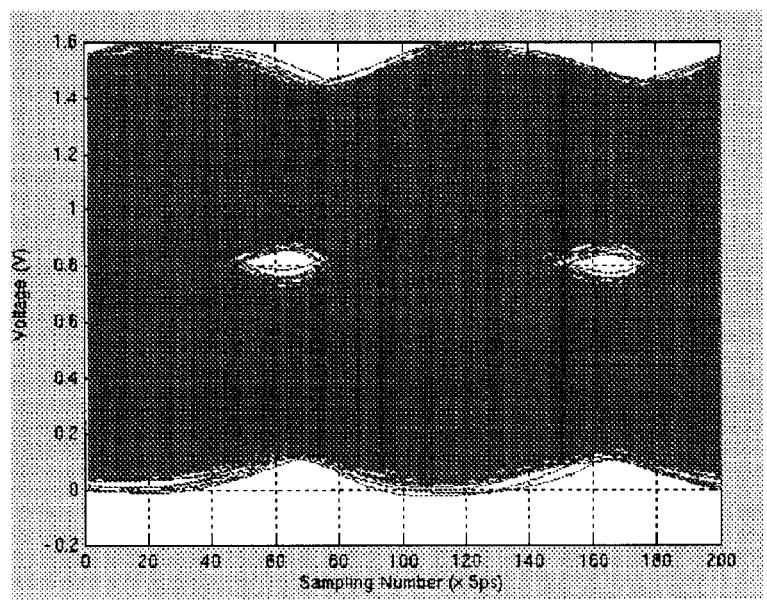
FIG. 6 illustrates an embodiment of a simulation result for cross- talk.

From comparing FIG. 9 to FIG. 7 it is apparent that crosstalk is significantly reduced to a range of approximately −200 mV to 290 mV. Moreover, in a comparison of FIG. 8 to FIG. 6, the eye in FIG. 6 is favorably affected as a result of the significant reduction in crosstalk. One method currently used to compensate for a reduced eye, such as in FIG. 6, is to increase the voltage swing of the bus. However, by reducing crosstalk and increasing the eye size with pulse shift modulation, the voltage swing may be reduced to obtain the same voltage margin, while reducing power consumption.

As can be seen from above, pulse shift modulation may be used to reduce crosstalk, by ensuring specific scenarios that induce significant amounts of crosstalk do not occur. As a result, power consumption may be reduced and the speed at which data is transmitted on interconnects may be increased. This is achieved by reducing the crosstalk, which results in better voltage and timing margins. Therefore, faster more robust interconnects may be designed utilizing pulse shift modulation.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   determining the direction of a logical transition between a first input pulse and a second input pulse;
   generating an output pulse wave delayed by a shift period, if the direction of the logical transition is in a first direction; and
   generating the output pulse wave, not delayed by the shift period, if the direction of the logical transition is in a second direction.

2. The method of claim 1, wherein the first input pulse is in a first unit interval and the second input pulse is in a second unit interval.

3. The method of claim 2, wherein determining the direction of a logical transition comprises:
   comparing the second input pulse to the first input pulse;
   determining the direction is a falling direction, if the first input pulse is at a high logic level and the second input pulse is at a low logic level; and
   determining the direction is a rising direction, if the first input pulse is at a low logic level and the second input pulse is at a high logic level.

4. The method of claim 3, wherein the first direction is a falling direction, and wherein the second direction is a rising direction.

5. The method of claim 4, wherein the shift period is large enough to ensure a rising edge of the output pulse wave occurs in the first unit interval and a falling edge of the output pulse wave occurs in the second unit interval.

6. The method of claim 3, wherein the first direction is a rising direction and the second direction is a falling direction, and wherein the shift period is large enough to ensure a falling edge of the output pulse wave occurs in the first unit interval and a rising edge of the output pulse wave occurs in the second unit interval.

7. The method of claim 1, wherein the first and second input pulses are received by and the output pulse wave is generated by an output buffer, the output buffer to transmit the output pulse wave over an interconnect.

8. The method of claim 7, wherein the interconnect is a common-standard interface (CSI) interconnect.

9. An apparatus comprising:
   control logic to compare a previous pulse to a current pulse;
   delay logic to delay the current pulse by a shift value, if the previous pulse is at a first logic level and the current pulse is at a second logic level; and
   pulse generation logic to generate an output pulse based on the current pulse.

10. The apparatus of claim 9, wherein the output pulse is delayed by at least the shift value, if the current pulse is delayed by the shift value.

11. The apparatus of claim 9, wherein the previous pulse and the current pulse comprise a symbol period.

12. The apparatus of claim 11, wherein the first logic level is a high voltage level, and wherein the second logic level is a low voltage level.

13. The apparatus of claim 12, wherein a rising edge of the output pulse occurs in a first half of the symbol period and a falling edge of the output pulse occurs in a second half of the symbol period.

14. A system comprising:
    a first component;
    a second component coupled to the first component through a plurality of traces forming an interconnect, the second component having a plurality of buffers to transmit data over the plurality of traces to the first component, each of the plurality of buffers including a module to generate a selectively delayed output waveform based on a transition between a first input bit and a second input bit.

15. The system of claim 14, wherein the module comprises:
    a control module to determine if a transition between the first input bit and the second input bit is in a first direction; and
    a pulse generation module to generate the output waveform delayed by a shift value, if the transition between the first input bit and the second input bit is in the first direction.

16. The system of claim 14, wherein the first and second component are each selected from a group consisting of an embedded controller, a microcontroller, a microprocessor, a co-processor, a digital signal processor, a processing cell, an out-of-order microprocessor capable of multi-threaded execution, a controller hub, a chipset, a CSI device, a video controller, a graphics processor, a network device, a memory, an audio device, a bridge device, and a peripheral device.

17. The system of claim 16, wherein the interconnect is an interconnect selected from a group consisting of a universal serial bus, a PCI bus, a CSI bus, a front-side bus (FSB), a memory bus, and a controller hub link bus.

18. The system of claim 14, wherein the first direction is a falling direction, and wherein the shift value is large enough to ensure that a falling edge of the output waveforms in each of the output buffers occur in a second unit interval of the output waveforms.

19. The system of claim 18, wherein the output waveform is not delayed by the shift value, if there is no transition between the first and second input bits or the transition is in a second direction.

20. The system of claim 14, wherein the first direction is a rising direction, and wherein the shift value is large enough to ensure that a rising edge of the output waveforms in each of the output buffers occur in a second unit interval of the output waveforms.

* * * * *